United States Patent
Hermann et al.

(10) Patent No.: US 10,435,086 B2
(45) Date of Patent: Oct. 8, 2019

(54) SPOILER ARRANGEMENT OF A MOTOR VEHICLE

(71) Applicant: Dr. Ing. h.c. F. Porsche Aktiengesellschaft, Stuttgart (DE)

(72) Inventors: Felix Hermann, Leonberg (DE); Sebastian Collet, Leonberg (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 15/871,144

(22) Filed: Jan. 15, 2018

(65) Prior Publication Data
US 2018/0215423 A1    Aug. 2, 2018

(30) Foreign Application Priority Data
Jan. 27, 2017    (DE) .................. 10 2017 101 607

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01); *Y02T 10/82* (2013.01)

(58) Field of Classification Search
CPC ...... B62D 35/00; B62D 35/02; B62D 35/007; B62D 35/008; B62D 37/02; Y02T 10/82
USPC .......................................... 296/180.1–180.5
See application file for complete search history.

(56) References Cited

U.S. PATENT DOCUMENTS

| | | | | |
|---|---|---|---|---|
| 2,069,955 | A * | 2/1937 | Jackson | B60S 1/54 454/123 |
| 4,887,681 | A * | 12/1989 | Durm | B60K 11/08 180/68.1 |
| 4,889,382 | A * | 12/1989 | Burst | B60K 11/08 296/180.5 |
| 5,923,245 | A * | 7/1999 | Klatt | B60Q 1/302 180/68.3 |
| 9,096,279 | B2 * | 8/2015 | Beierl | B62D 35/007 |
| 2009/0160213 | A1 * | 6/2009 | Paul | B62D 35/007 296/180.1 |
| 2013/0062132 | A1 * | 3/2013 | Wolf | B62D 35/007 180/68.1 |

FOREIGN PATENT DOCUMENTS

DE    102013021767 A1    6/2015

* cited by examiner

*Primary Examiner* — Dennis H Pedder
(74) *Attorney, Agent, or Firm* — Leydig, Voit & Mayer, Ltd.

(57) ABSTRACT

A spoiler arrangement of a motor vehicle includes a spoiler blade, a body portion to which the spoiler blade attaches, a displacement device for the spoiler blade, the displacement device being configured to move the spoiler blade relative to the body portion between a retracted position and an extended position; and a cover configured to attach to the spoiler blade and to at least partially close a rear gap which is formed, in the extended position of the spoiler blade, between a rear edge of the spoiler blade and an adjoining assembly of the body portion.

14 Claims, 4 Drawing Sheets

SPOILER ARRANGEMENT OF A MOTOR VEHICLE

CROSS REFERENCE TO RELATED APPLICATIONS

This application claims benefit to German Patent Application No. DE 10 2017 101 607.4, filed Jan. 27, 2017, which is hereby incorporated by reference herein.

FIELD

The invention relates to a spoiler arrangement of a motor vehicle.

BACKGROUND

DE 10 2013 021 767 A1 discloses a spoiler arrangement of a motor vehicle, having a spoiler blade, wherein the spoiler blade attaches to a body portion. Via a displacement device, which, according to DE 10 2013 021 767 A1, comprises a hinge arrangement, the spoiler blade is displaceable relative to the body portion, specifically between a retracted position and an extended position. Via a covering element, the hinge arrangement can be laterally covered.

SUMMARY

In an embodiment, the present invention provides a spoiler arrangement of a motor vehicle. The spoiler arrangement includes a spoiler blade; a body portion to which the spoiler blade attaches; a displacement device for the spoiler blade, the displacement device being configured to move the spoiler blade relative to the body portion between a retracted position and an extended position; and a cover configured to attach to the spoiler blade and to at least partially close a rear gap which is formed, in the extended position of the spoiler blade, between a rear edge of the spoiler blade and an adjoining assembly of the body portion.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide novel spoiler arrangements for a motor vehicle.

According to one or more embodiments of the invention, a spoiler arrangement is provided in which a cover attaches to the spoiler blade, the cover at least partially closing a rear gap which is formed, in the extended position of the spoiler blade, between a rear edge of the spoiler blade and an adjoining assembly of the body portion.

According to one or more embodiments of the invention, a rear gap can be partially closed, the rear gap being formed between the rear edge of the spoiler blade and the assembly, adjoining this rear edge, of the body portion, with a cover in the extended position of the spoiler blade.

As a result, a displacement device is covered either completely or at least largely, with the result that not only is the optical quality of the motor vehicle enhanced, but it is also possible to prevent foreign bodies from passing into the rear gap.

According to one or more embodiments of the invention, the cover extends in the transverse direction of the vehicle and in the vertical direction of the vehicle, wherein the cover preferably also extends, at lateral edges thereof, in the longitudinal direction of the vehicle. With such a cover, the rear gap can advantageously be at least partially closed.

According to one or more embodiments of the invention, the cover is embodied as a separate assembly and is connected to a lower part of the spoiler blade. Alternatively, the cover is an integral constituent part of the lower part of the spoiler blade. Embodiments in which the cover is a separate assembly and releasably fastened to the spoiler blade make it possible to exchange the cover.

Preferably, the adjoining assembly of the body portion, said assembly partially bounding the rear gap in the extended position of the spoiler blade, is configured as a rear lighting unit, wherein a top side, facing the spoiler blade, of the rear lighting unit is covered by a further cover which extends in the transverse direction of the vehicle and in the longitudinal direction of the vehicle. In this way, the optical quality with the spoiler blade extended can be improved further.

Embodiments of the invention relate to a spoiler arrangement of a motor vehicle, as is used in a rear region of the motor vehicle, beneath a rear window.

Figure 1:
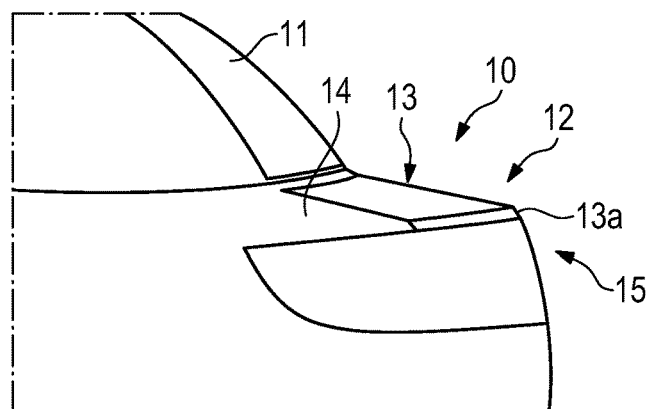
FIG. 1 shows a detail of a motor vehicle in a region of a spoiler arrangement according to an embodiment of the invention in where the spoiler blade is in the retracted position.
Figure 2:
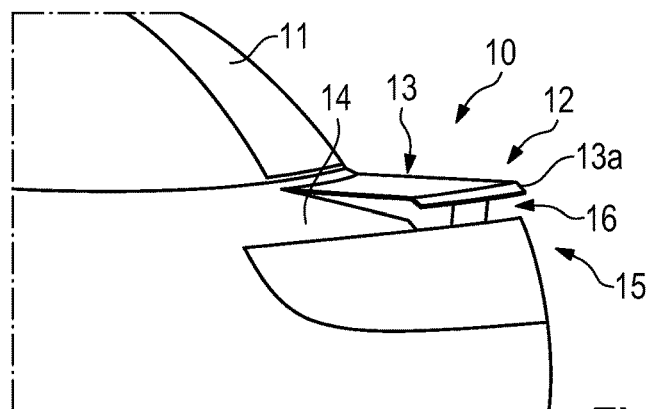
FIG. 2 shows the detail from FIG. 1 with the spoiler blade in a first extended position of the spoiler blade.
Figure 3:
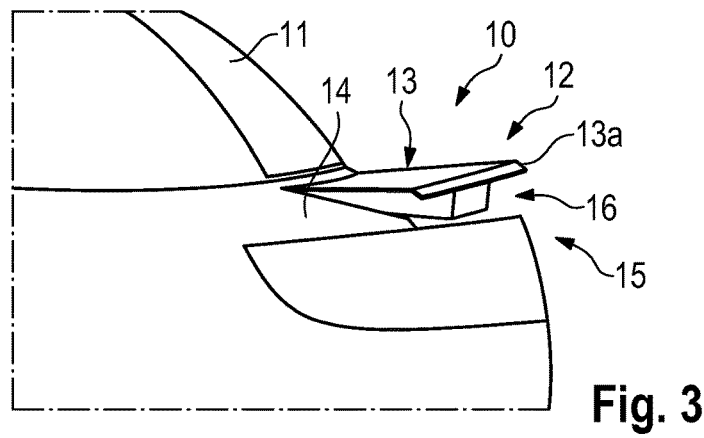
FIG. 3 shows the detail from FIG. 2 with the spoiler blade in a second extended position.

FIGS. 1 to 3 each show a detail of a motor vehicle, namely a detail of a rear region 10 of the motor vehicle, wherein a spoiler arrangement 12 is positioned beneath a rear window 11.

The spoiler arrangement 12 has a spoiler blade 13 which attaches to a body portion 14 of the rear region 10 of the motor vehicle, wherein the spoiler blade 13 can be displaced relative to the body portion 14 via a displacement device 27, specifically between a retracted position and an extended position. FIGS. 4 to 7 show the displacement device 27 in cross section.

Figure 4:
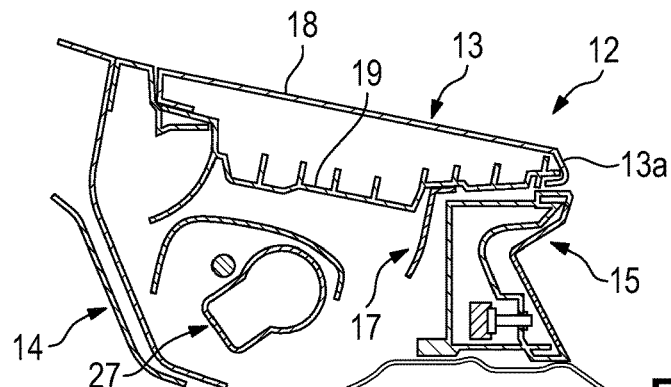
FIG. 4 shows a cross section through the spoiler arrangement with the spoiler blade in the retracted position.
Figure 5:
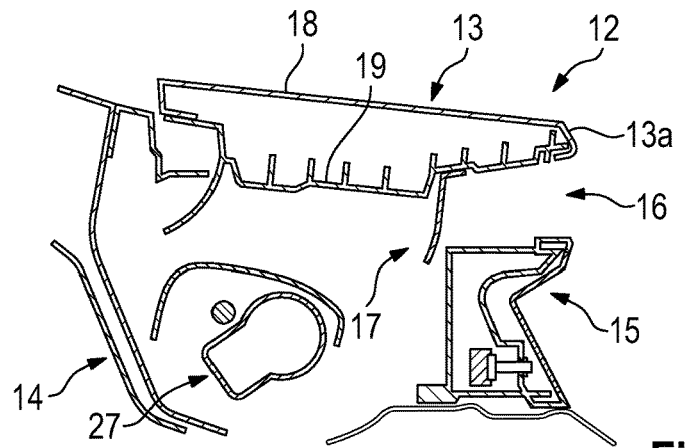
FIG. 5 shows the cross section from FIG. 4 with the spoiler blade in the first extended position.
Figure 6:
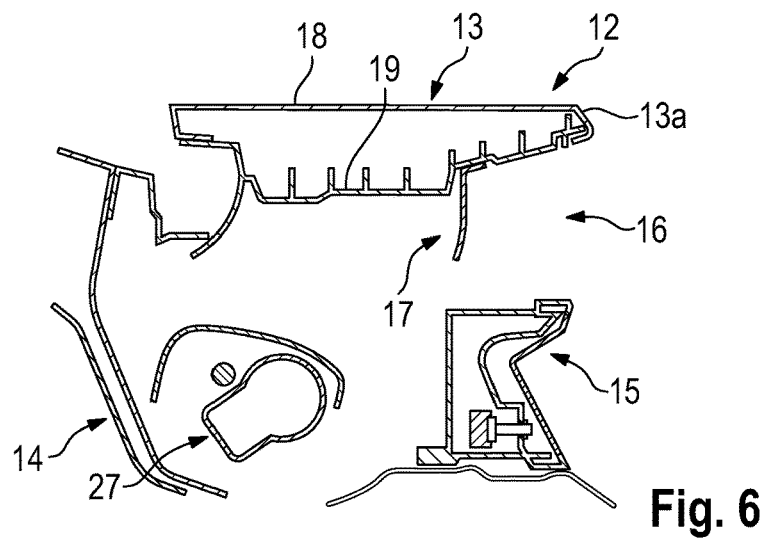
FIG. 6 shows the cross section from FIG. 4 with the spoiler blade in the second extended position.
Figure 7:
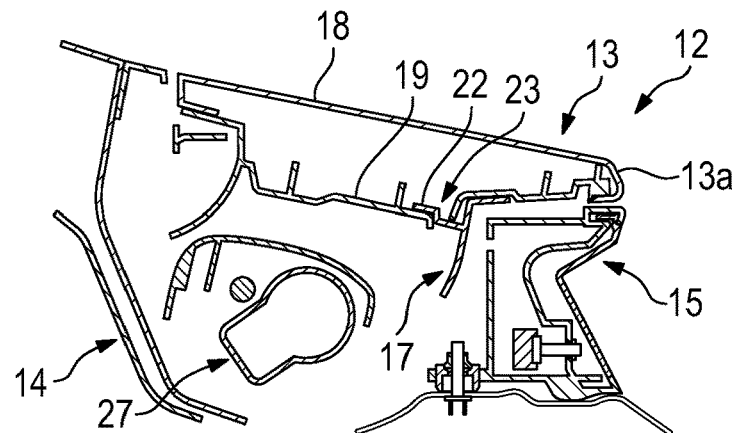
FIG. 7 shows a cross section, offset in parallel in the longitudinal direction of the vehicle compared with FIG. 4, through the spoiler arrangement.
Figure 8:
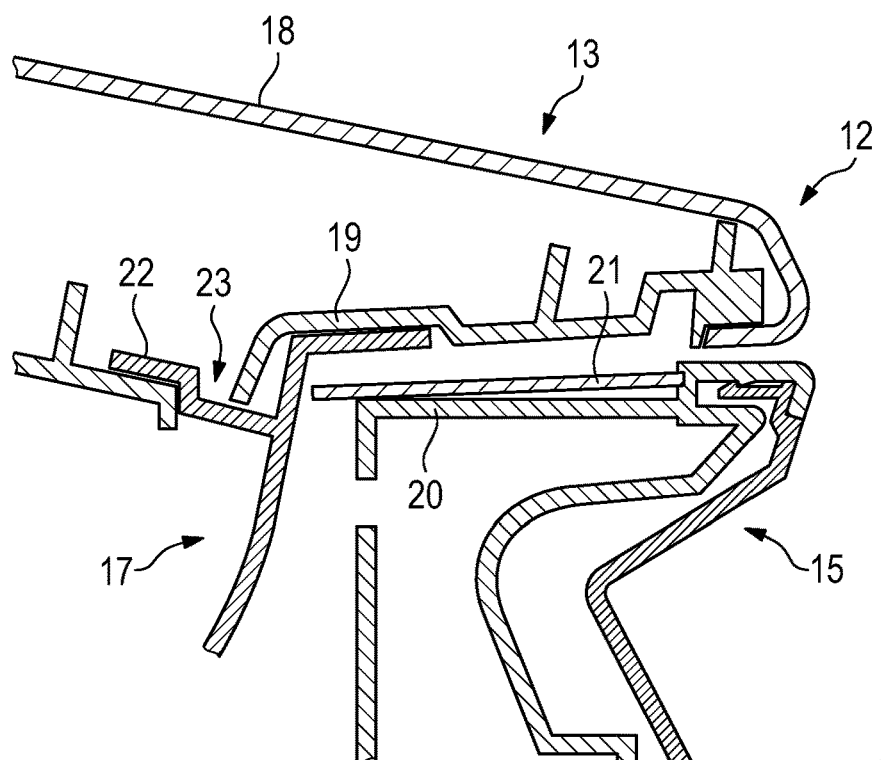
FIG. 8 shows the cross section from FIG. 4 together with a further cover.

FIGS. 1 and 4 show the spoiler arrangement 12 in a position retracted into the body portion 14. FIGS. 3 and 6 show the spoiler arrangement 12 in a position extended out of the body portion 14 to the maximum. FIGS. 2 and 5 show the spoiler arrangement 12 in a position likewise extended out of the body portion 14, said position being between the retracted position in FIGS. 1 and 4 and the position extended to the maximum in FIGS. 3 and 6.

As can be gathered from FIGS. 2 and 3 and FIGS. 5 and 6, when the spoiler blade 13 is extended out of the body portion 14, a rear gap 16 forms between a rear edge 13a of the spoiler blade 13 and an assembly 15, adjoining this rear edge 13a, of the body portion 14, the size of this gap in the vertical direction being dependent on the extent to which the spoiler blade 13 has been extended out of the body portion 14. The assembly 15 adjoining the rear edge 13a of the spoiler blade 13 is a rear lighting unit of the motor vehicle in the exemplary embodiment shown.

A cover 17 attaches to the spoiler blade 13, said cover at least partially closing the rear gap 16 that forms in the extended position of the spoiler blade 13. In the eco-position in FIGS. 2 and 5, the rear gap 16 is completely closed by the cover 17 from the rear as seen in the direction of the rear region 10 of the motor vehicle, such that a view of the displacement device for the spoiler blade 13 is completely blocked from the rear. In the performance position, extended to the maximum, in FIGS. 3 and 6, the cover 17 only partially closes the gap 16 that forms. A residual gap then remains free.

The spoiler blade 13 has an upper part 18 and a lower part 19. The cover 17 attaches to the lower part 19 of the spoiler blade 13, wherein the cover 17 can be an integral constituent part of the lower part 19 of the spoiler blade 13; alternatively it is also possible for the cover 17 to be embodied as a separate assembly and to be connected to the lower part 19 of the spoiler blade 13.

FIGS. 6 to 11 show an embodiment of the invention in which the cover 17 is embodied as a separate assembly and is connected to the lower part 19 of the spoiler blade 13. The connection of the cover 17 to the lower part 19 of the spoiler blade 13 will be discussed in greater detail below.

The cover 17 extends at least partially in the transverse direction of the vehicle and in the vertical direction of the vehicle; the cover 17 is oriented in the vertical direction in order to cover the rear gap 16.

According to one or more embodiments of the invention, provision is made for the cover 17 to also extend, at lateral edges 17a thereof (see FIG. 10), in the longitudinal direction of the vehicle, wherein the cover 17 then also blocks a side view of the displacement device 27 for the spoiler blade 13 and then also laterally closes the gap 16 between the spoiler blade 13 and the body portion 14.

As already stated, the component 15 of the body portion 14, which, in the extended state of the spoiler blade 13, bounds the gap 16 to be covered at least partially by the cover 17, together with the spoiler blade 13, is a rear lighting unit 15, wherein, according to an advantageous development (see FIG. 8), provision is made for an upper side 20, facing the spoiler blade 13, of the rear lighting unit 15 to be covered by a further cover 21, wherein this further cover 21 extends in the transverse direction of the vehicle and in the longitudinal direction of the vehicle and is oriented horizontally. Via this further cover 21, in the extended position of the spoiler blade 13, a view of the upper side 20 of the rear lighting device 15 is blocked, with the result that the optical impression of the motor vehicle with the spoiler blade 13 extended can be improved further.

As already stated, in the exemplary embodiment, the cover 17 is embodied as a separate assembly which is releasably connected to the lower part 19 of the spoiler blade 13. In order to connect the cover 17 to the lower part 19 of the spoiler blade 13, use is made, on the one hand, of tab-like protrusions 22 on the cover 17, which engage in corresponding recesses 23 in the lower part 19 of the spoiler blade 13, and, on the other hand, use is made for this connection of clip-like elements 24 of the lower part 19 of the spoiler blade 13, which are clip-fastened together with protrusions 25 of the cover 17.

Figure 9:
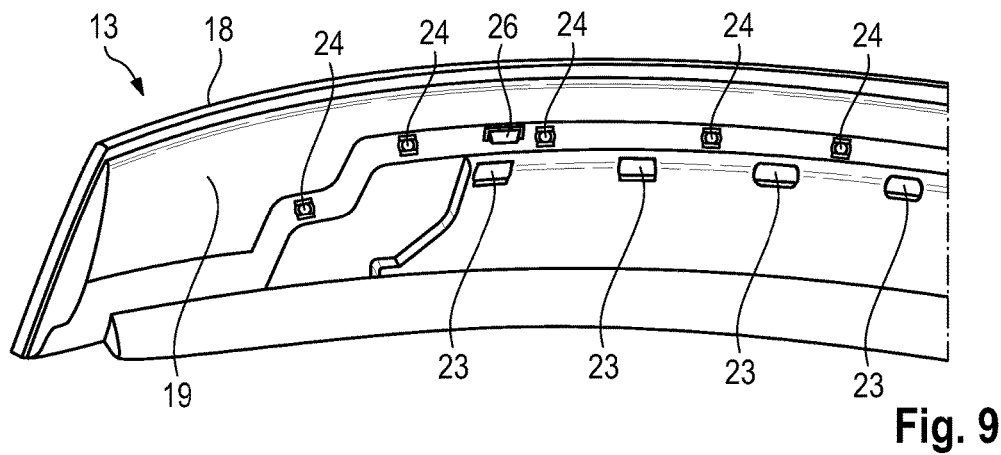
FIG. 9 shows the spoiler blade together with the cover in a perspective view obliquely from below.
Figure 10:
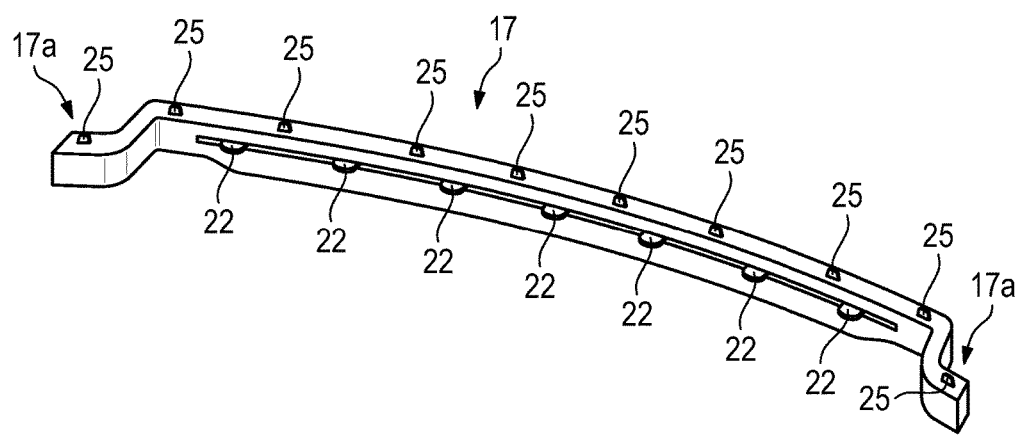
FIG. 10 shows the spoiler blade from FIG. 9 without the cover in a perspective view.
Figure 11:
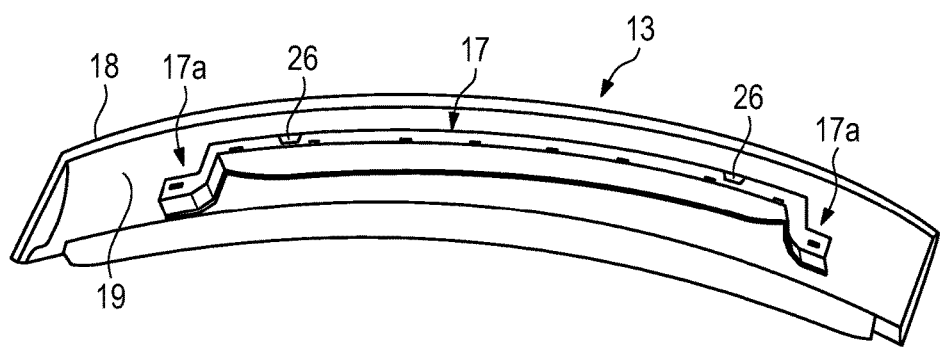
FIG. 11 shows the cover from FIG. 9 in a perspective view.

FIGS. 9 and 11 also show positioning aids 26 which can be attached to the lower part 19 of the spoiler blade 13 and which at least partially engage around an edge of the cover 17 in the mounted state (see FIG. 11) and thus define an exact position for the cover 17 together with the recesses 23 and the clip elements 24.

It should be noted at this point that the connection of the cover 17 to the lower part 19 of the spoiler blade 13 can also take place in some other manner, for example by screw-fastening or adhesive bonding.

When the cover 17 is an integral constituent part of the lower part 19 of the spoiler blade 13, there is no need for a separate connection.

One or more embodiments of the present invention accordingly propose at least partially closing a rear gap 16 between the spoiler blade 13 and a preferably adjoining rear lighting unit 15 via the cover 17 in an extended position of the spoiler blade 13, wherein the cover 17 is either formed as a separate assembly and fastened to the lower part 19 of the spoiler blade 13 or is alternatively formed directly from the lower part 19. The cover 17 follows the movement of the spoiler blade 13 and, depending on the extended position, either completely or partially blocks the view into this rear gap 16. In a position, manually approachable by customers, of the spoiler blade 13, which is also known as the showroom position, the cover 17 completely closes this rear gap 16.

When the cover 17 is embodied as a separate component, it can be embodied in one or more parts.

Furthermore, the cover 17 can also consist of a combination of portions integrally formed on the lower part 19 and of separate portions mounted on the lower part 19.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A spoiler arrangement of a motor vehicle, the spoiler arrangement comprising:
   a spoiler blade;
   a body portion to which the spoiler blade attaches;
   a displacement device for the spoiler blade the displacement device being configured to move the spoiler blade relative to the body portion between a retracted position and an extended position; and
   a cover comprising a first end and free end opposite the first end, the cover being configured to attach to the spoiler blade at the first end and to at least partially close a rear gap which is formed, in the extended position of the spoiler blade, between a rear edge of the spoiler blade and an adjoining assembly of the body portion
   wherein the free end remains unattached.

2. The spoiler arrangement as claimed in claim 1, wherein the cover extends in a transverse direction of the vehicle and in a vertical direction of the vehicle.

3. The spoiler arrangement as claimed in claim 2, wherein the cover also extends, at lateral edges thereof, in the longitudinal direction of the vehicle.

4. The spoiler arrangement as claimed in claim 1, wherein the cover is an integral constituent part of a lower part of the spoiler blade.

5. The spoiler arrangement as claimed in claim 1, wherein the cover is a separate assembly and is connected to a lower part of the spoiler blade.

6. The spoiler arrangement as claimed in claim 5, wherein the cover is releasably connected to the lower part of the spoiler blade.

7. The spoiler arrangement as claimed in claim 5, wherein the cover is connected permanently to the lower part of the spoiler blade.

8. The spoiler arrangement as claimed in claim 1, wherein the adjoining assembly of the body portion is configured as a rear lighting unit and partially bounds the rear gap in the extended position of the spoiler blade.

9. The spoiler arrangement as claimed in claim 8, wherein a top side, facing the spoiler blade, of the rear lighting unit is at least partially covered by a further cover.

10. The spoiler arrangement as claimed in claim 9, wherein the further cover extends in a transverse direction of the vehicle and in a longitudinal direction of the vehicle.

11. The spoiler arrangement as claimed in claim 3, wherein at the lateral edges of the cover, end-most regions of the lateral edges extend in the transverse direction and are connected to a middle region of the cover, which extends in the transverse direction, by connecting regions of the lateral edges, which extend in the longitudinal direction.

12. The spoiler arrangement of claim 11, wherein the cover blocks a side view of the displacement device.

13. The spoiler arrangement of claim 1, wherein the free end extends from the first end in a vertical direction of the vehicle.

14. The spoiler arrangement of claim 1,
   wherein the spoiler blade comprises a plurality of recesses at a side where the cover attaches, and
   wherein the cover comprises a plurality of tabs at the first end, the tabs extending into the recesses to attach the cover to the spoiler blade.

* * * * *